(12) United States Patent  
Barley (10) Patent No.: US 9,327,583 B2  
(45) Date of Patent: May 3, 2016

(54) ACTUATION MECHANISM FOR A TARPING SYSTEM

(71) Applicant: Aero Industries, Inc., Indianapolis, IN (US)

(72) Inventor: Dennis Barley, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 14/244,683

(22) Filed: Apr. 3, 2014

(65) Prior Publication Data

US 2014/0217768 A1    Aug. 7, 2014

Related U.S. Application Data

(63) Continuation of application No. 13/492,076, filed on Jun. 8, 2012, now Pat. No. 8,690,223.

(51) Int. Cl.
*B60J 7/08* (2006.01)
(52) U.S. Cl.
CPC ...................... *B60J 7/085* (2013.01)
(58) Field of Classification Search
CPC ...................................... B60J 7/085

USPC ................ 296/98, 100.01, 100.11, 100.14
See application file for complete search history.

(56) References Cited

U.S. PATENT DOCUMENTS 5,887,937 A * 3/1999 Searfoss ................. 296/122  
2012/0187712 A1* 7/2012 Bromberek ............... 296/98

\* cited by examiner

*Primary Examiner* — Glenn Dayoan  
*Assistant Examiner* — Melissa A Black  
(74) *Attorney, Agent, or Firm* — Maginot, Moore & Beck, LLP (57) ABSTRACT

An actuation assembly for a cover extendable over an open-topped container body from a stowed position to a deployed position includes two actuator mechanisms on each side of the body, each including at least one torsion spring having a base portion and at least one reaction end and at least one reaction post in contact with a corresponding reaction end of the at least one spring. In a first exterior actuator mechanism, the reaction post is connectable to the bail arm, while in the second interior actuator mechanism the reaction post is mountable to the container body. A common shaft extends between the base portions of the spring(s) of each actuator mechanism to transmit torque from the interior spring(s) to the exterior spring(s), serving as a rotating anchor for the exterior actuator mechanism. In one embodiment, only the exterior actuator mechanism is situated outside the side extent of the container body.

17 Claims, 5 Drawing Sheets

ACTUATION MECHANISM FOR A TARPING SYSTEM

REFERENCE TO RELATED APPLICATION AND PRIORITY CLAIM

The present application is a continuation of and claims priority co-pending application Ser. No. 13/492,076, filed on Jun. 8, 2012, the entire disclosure of which is incorporated herein by reference, and which application issued as U.S. Pat. No. 8,690,223 on Apr. 8, 2014.

BACKGROUND

The present disclosure relates to covers or tarping systems for open-topped containers, and more specifically to an actuation mechanism for pivoting the cover over a truck bed.

Some hauling vehicles, such as dump trucks, include open-topped containers used for hauling or storing various materials. For example, in a typical dump truck application, the dump body is used to haul a variety of particulate material, such as gravel, aggregate or similar products. In addition, some hauling vehicles carry organic materials, such as grain or produce.

Depending upon the nature of the materials stored in the open-topped container, it is often desirable to provide a cover for the container. Of course, rigid covers are well known that may be hinged from one end of the container body. These rigid covers have gradually given way in the industry to flexible tarping systems because the flexible tarpaulin can be easily stowed when a cover is not necessary, such as when the dump bed is being loaded. Moreover, the flexible tarp is much easier to deploy than a rigid cover.

Figure 1:
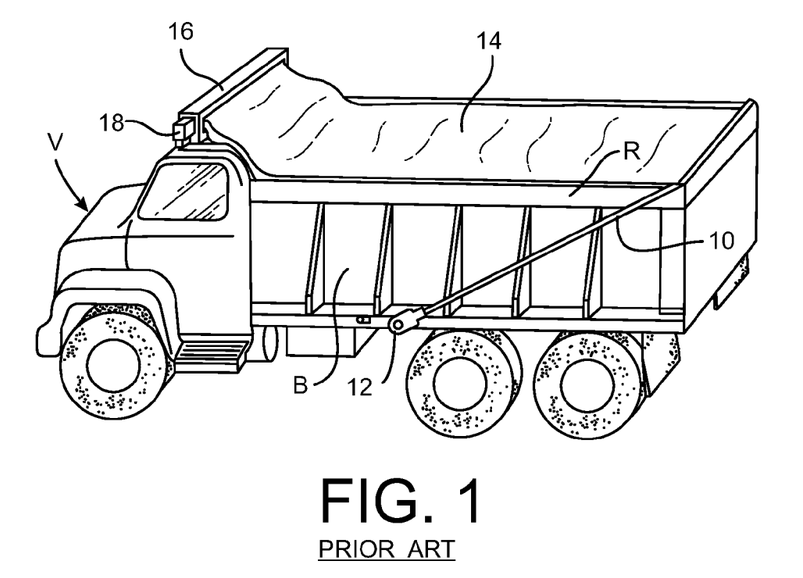
FIG. 1 is a perspective view of a vehicle utilizing a tarping system to cover the open-topped body of the vehicle.

One tarping system for use with dump trucks is the Easy Cover® Tarping System, of Aero Industries, Inc. The Easy Cover® Tarping System includes a U-shaped bail member that is pivotally mounted at its ends to the base of the container body. The horizontal section of the U-shaped bail is attached to the tarp, while the free ends of the vertical elements are pivotally mounted. As shown in FIG. 1, a vehicle V having an open-topped body B, such as a dump truck, includes a tarpaulin cover 14, which is shown in its deployed configuration spanning the length of the container. The tarp cover 14 is wound and unwound from a tarp roller assembly 16 at one end (typically the forward end) of the bed.

A U-shaped bail member 10 is connected to one end of the tarp cover 14 and is pivotally mounted to the truck body B by way of an actuation mechanism 12. This actuation mechanism can take a variety of forms including extension springs, compression spring, and coil torsion springs which apply a torque or moment to the arms of the U-shaped bail member 10. When the actuation mechanism is released, it automatically pivots the bar, thereby unfurling the tarp from the tarp roller assembly 16. A hand crank or powered motor 18 can be provided to rotate the tarp roller in the opposite direction to wind the tarp into the roller assembly when it is desired to open the container top.

One such actuation mechanism implemented in the Easy Cover® Tarping System incorporates a "double-coil" spring as more fully described in U.S. Pat. No. 6,318,790 to Henning (the '790 Patent), the disclosure of which is incorporated herein by reference. As shown in FIG. 4 of the '790 Patent the actuation mechanism includes one or more elastically deformable double-coil springs having two coil portions concentrically wound around each other and disposed in a common plane with an integral center anchor section between each of the coil portions. A free reaction end of each coil portion is connected to an arm of the bail member through a pair of reaction posts mounted on the arm. The center anchor section is held fixed relative to the bail arm and is generally fixed to the dump body by an pivot shaft mounted thereto, such as the pivot shaft shown in FIG. 5 of the '790 Patent. As shown in FIG. 6 of the '790 Patent, the deployment mechanism includes a housing that sandwiches the double coil springs between opposed housing halves that are secured to the leg of the bail member.

The actuation mechanism disclosed in the '790 Patent thus provides a great amount of torque in a small package that is capable of meeting vehicle width limitation regulations. With tarping systems of this type, the torque in the springs is greatest when the cover is open and the springs are rotated to their maximum angular position. On the other hand, when cover is extended or closed the spring torque is at a minimum as the springs are unwound. The reduced torque means that the springs are not exerting sufficient force to hold down the end of the closed tarp when the vehicle is subject to road vibration and bounce. Auxiliary mechanisms may be provided to hold the tarp end down in the open position. It is desirable to provide an increased spring torque at the unwound position of the spring, but doing so necessarily increases the spring torque at the fully wound open cover position. Greater torque in a fully wound spring increases the risk of failure of the spring. The actuation mechanisms of the type described in the '790 Patent have an improved torque range that helps address this problem. However, in some vehicle applications it is desirable for the actuation mechanism to be mounted near the top rail R of the body B. An actuation mechanism mounted at the top rail necessarily travels through a broader angle than a mechanism mounted at the bottom of the container. For instance, in a typical bottom-mounted installation the actuation mechanism travels through a maximum range of about 140°, while a top rail mounted mechanism travels through a range of 160-170°. There is a need for an actuation mechanism that can maintain an appropriate torque throughout the larger range of travel of the top rail mounted system.

SUMMARY

According to an embodiment of the present disclosure an improvement to coil spring actuation mechanism for a cover system on an open-topped container is provided. The actuation assembly is provided for a cover system on an open-topped container body, the cover system including a cover extendable from a stowed position to a deployed position covering the container body and a bail member attached to the cover and movable relative to the container body to move the cover between its two positions. The assembly comprises two actuator mechanisms on each side of the body, each mechanism including at least one torsion spring having a base portion and at least one reaction end and at least one reaction post in contact with a corresponding reaction end of the at least one spring. In a first exterior actuator mechanism, the at least one reaction post is connectable to the bail arm, such as through a housing containing the torsion spring(s) of the first mechanism. In the second interior actuator mechanism, the reaction post is mountable to the container body, such as through a housing containing the torsion spring(s) of the second mechanism.

In one aspect, a common shaft extends between the base portions of the spring(s) of each actuator mechanism. The shaft thus transmits torque from the second interior spring(s) to the first exterior spring(s), serving as a rotating anchor for the exterior actuator mechanism. The springs and shaft are thus configured to provide a series spring for actuation of the bail arm. In a further aspect, only the exterior actuator mechanism is situated outside the side extent of the container body.

BRIEF DESCRIPTION OF THE DRAWINGS

The accompanying drawings illustrate embodiments of the present disclosure and together with a description serve to explain the principles of the disclosure.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
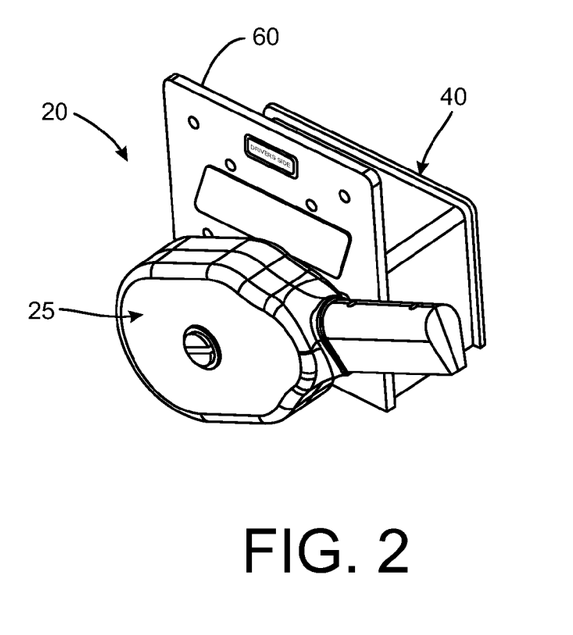
FIG. 2 is a perspective view of an actuation mechanism according to one embodiment of the present disclosure.

According to the present disclosure, an actuation assembly 20 (FIG. 2) is provided that may be mounted to opposite sides of the vehicle V in lieu of the mechanism 12 shown in FIG. 1. The assembly 20 includes an exterior actuator mechanism 25 and an interior actuator mechanism 40, both mounted to the vehicle by way of a mounting plate 60. The interior actuator 40 is supported by the mounting plate 60 so that it is inside the side width of the vehicle V or dump body B or inside a wall of the vehicle or dump body. In other words, the mounting plate 60 and interior actuator mechanism 40 are configured so that the plate may be mounted to the bottom of the body B so that the actuator mechanism is substantially fully contained within the lateral extent of the body. Similarly, the mounting plate 60 may be mounted to the upper rail R so that the interior actuator mechanism 40 is beneath and contained within the lateral extent of the rail. Alternatively the plate may be configured to mount directly to a side wall of the body B with the interior actuator mechanism essentially passing through the side wall. Thus, the width profile of the assembly 20 is no greater than lateral extension of the exterior actuator mechanism 25, which can be no greater than the systems of the prior art discussed above. The width of the assembly 20 outside the vehicle or body is thus determined by the dimensions of the exterior actuator mechanism 25.

Figure 3:
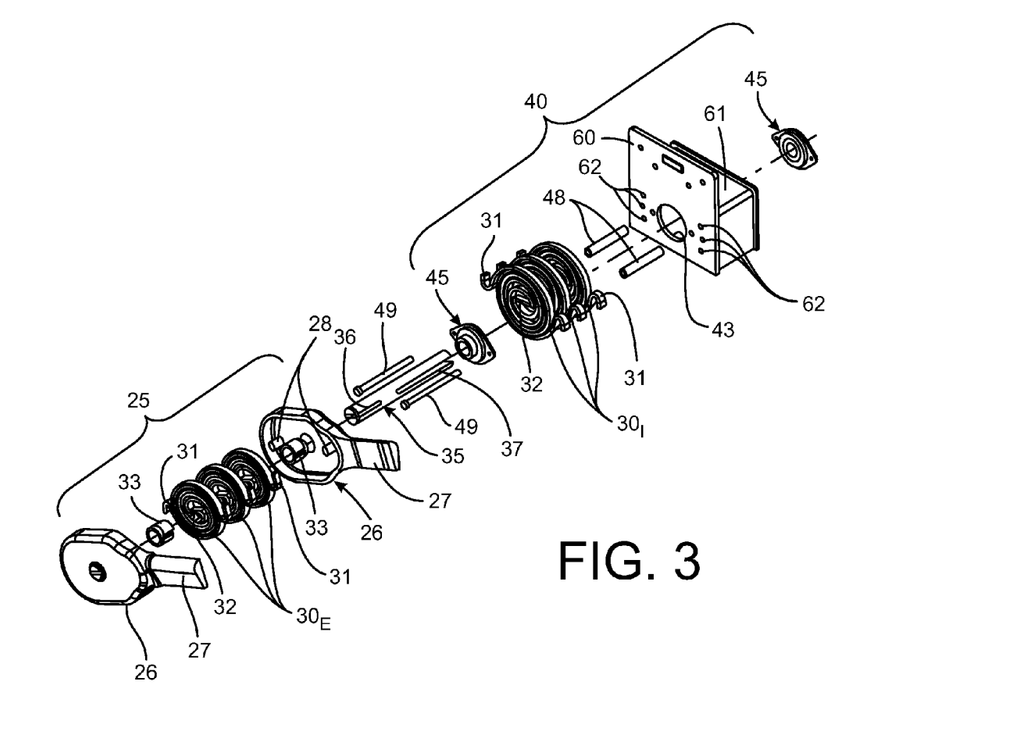
FIG. 3 is an exploded view of the actuation mechanism depicted in FIG. 2.

In one aspect, the exterior actuator mechanism 25 is configured like the actuator mechanism disclosed in the '790 Patent. Thus, as illustrated in FIG. 3, the actuator mechanism 25 includes a pair of housing halves 26 that combine to contain a torsion spring pack $30_E$. In the illustrated embodiment, the spring pack includes multiple double-coil springs of the type disclosed in the '790 Patent. The housing halves each include a stem 27 that is configured to engage the end of a leg of the bail arm 10. The springs $30_E$ include opposing and oppositely aligned hooks 31 configured to engage reaction posts 28 formed on the inside of the housing halves 26. The springs include a base portion 32 that fits within a slot 36 defined in one end of a connection element 35 which in the illustrated embodiment is an elongated central shaft. Other forms of torsion springs are contemplated for use in the actuator mechanism 25, such as a single coil spring of the type shown in FIGS. 2-3 of U.S. Pat. No. 6,318,790, the associated description of which is incorporated herein by reference. It can be appreciated that a single coil spring includes only one hook at the end of the spring so only one reaction post 28 is required in the housing halves. The single coil springs also include an abbreviated base portion at the interior of the spring that may be engaged within the slot 36 of the central shaft 35.

In the case of double coil spring, the base portion 32 is a center portion between the two coils of the spring. A double coil spring pack may be provided with a bushing 33 on either side of the spring pack that is configured like the bushing disclosed in U.S. Pat. No. 8,061,759 ('759 Patent), the disclosure of which is incorporated herein by reference. The bushings 33 help prevent fatigue or failure of the double coil springs $30_E$, as described in the '759 Patent. As thus far described, the exterior actuator mechanism is substantially similar to the mechanism disclosed in the '790 Patent, except that the central shaft 35 is modified as described below.

Figure 5:
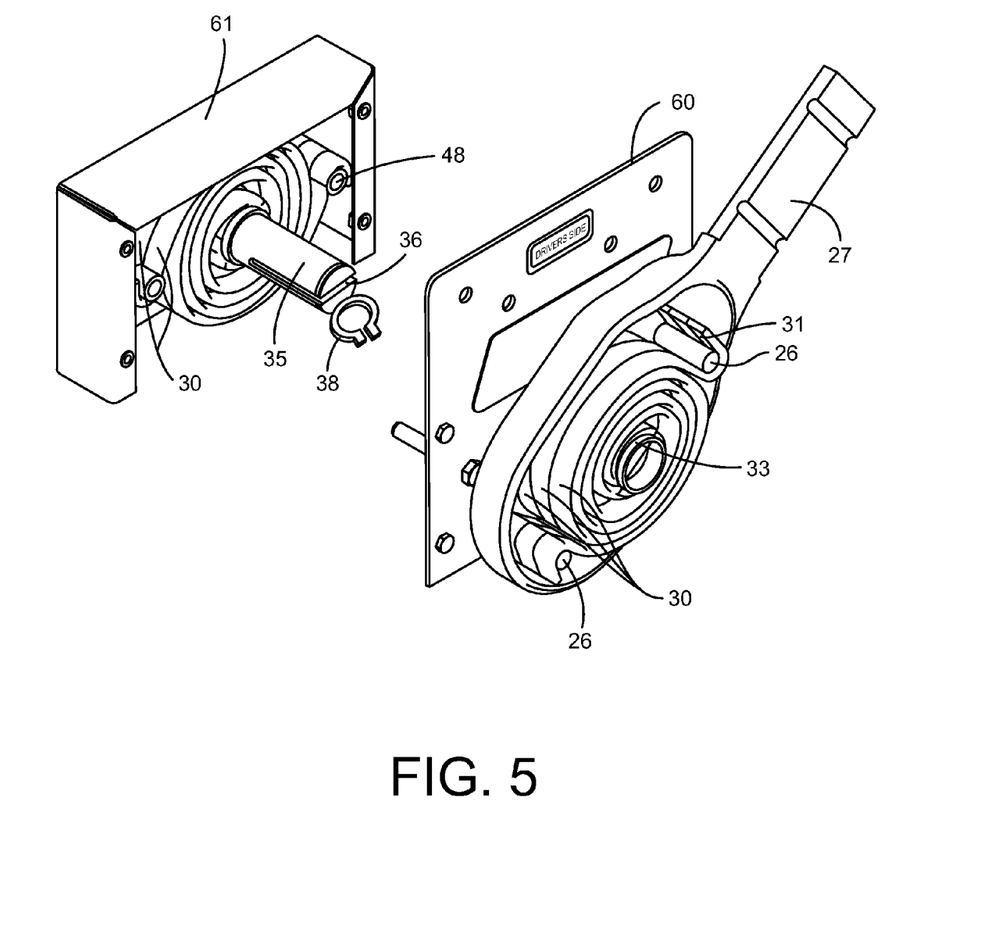
FIG. 5 is an exploded view of the interior and exterior double coil torsion springs of the mechanism shown in FIG. 2.

In the prior art mechanism disclosed in the '790 Patent the central shaft serves as an anchor for the double coil spring pack. In the prior art mechanism the center portion of the springs is held fixed while the housing pivots with the bail arm, with the spring torque applied at the reaction posts pivoting with the housing. In accordance with one aspect of the present disclosed system 20, the connection element or shaft 35 serves as a relative anchor that is capable of rotation itself. In particular, the shaft 35 is sized to extend into the interior actuator mechanism 40, as shown in FIGS. 3 and 5. The interior actuator mechanism 40 may be substantially similar to the exterior mechanism in that it includes a plurality of double coil springs $30_I$, each having opposing hooks 31 and a base portion 32. The base portion 32 is disposed within a slot 37 defined at an opposite end of the elongated shaft 35. The hooks 31 engage reaction pins 48 to anchor the springs $30_I$. In some embodiments the reaction pins may be adjustably mounted to the housing 61 of the interior mechanism by way of fasteners 49. In particular, the reaction pins 48 may be selectively mounted at any of the openings 62 (FIG. 3) to adjust the amount of torque generated by the springs $30_I$ at the wound and unwound positions of the springs. As with the actuator mechanism 25, the mechanism 40 may incorporate torsion spring configurations other than the double coil spring pack in the illustrated embodiments, such as the single coil spring described above.

Figure 4:
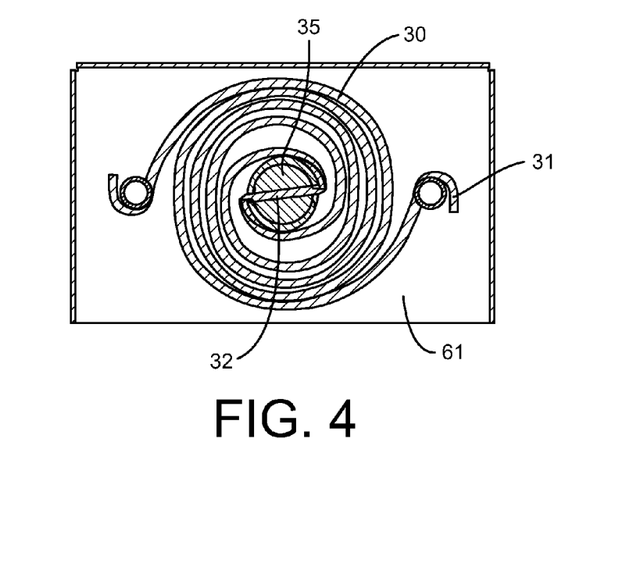
FIG. 4 is a side view of an interior double coil torsion spring of the mechanism shown in FIG. 2.

The housing 61 containing the interior spring pack is fastened to the vehicle via the mounting plate 60. It can thus be appreciated that the hooks 31 of the springs $30_I$ in the interior actuator mechanism 40 are anchored to the vehicle by way of the housing 61. Since the hooks are anchored, the base portion 32 of the interior springs $30_I$ is free to pivot or rotate to store torque in or transmit torque from the springs. The shaft 35 is coupled to this base portion, so a bushing 45 is provided in opposite openings 43 (FIGS. 3, 4) defined in the housing 61 and mounting plate 60. Each bushing is configured to permit free rotation of the shaft relative to the housing 61. It is understood that the bushings 45 may be low friction bushings or may be rotational bearings that permit free rotation of the shaft. A snap ring 38 (FIG. 5) holds the shaft 35 in position against the housing 26 of the exterior actuator mechanism 25. A snap ring may be engaged to the opposite ends of the shaft to essentially lock the shaft between the two housings 26 and 61.

Figure 6:
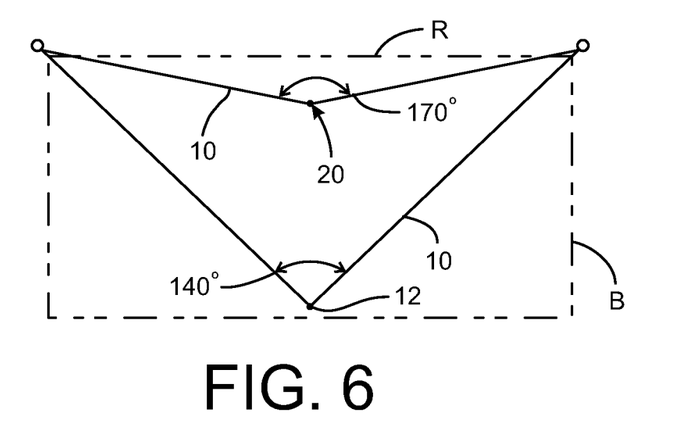
FIG. 6 is a schematic representation of the angular movement of a bail arm at two pivot locations on a vehicle body.

The actuation assembly 20 disclosed herein in essence expands the range of meaningful torque applied to the bail arm, while maintaining the assembly within the periphery of the vehicle V or dump body B. The shaft 35 extending between the interior springs $30_I$ and exterior springs $30_E$ provides a series spring assembly that not only extends the angle of rotation capability of the assembly 20 but also ensures sufficient torque to keep pressure on the bail arm throughout the entire angular stroke of the assembly. The angular rotation capability of the system is demonstrated with reference to the schematics in FIGS. 6, 7a, 7b. Turning first to FIG. 6, it can be seen that in the typical installation as represented in FIG. 1, with the actuation mechanism 12 mounted at the base of the dump body B the bail arm sweeps through a typical angle of about 140°, depending upon the length and height of the dump body. However, if the actuation mechanism is moved to a location adjacent the top rail R, such as the actuation system 20 in FIG. 6, the bail arm must travel through an arc of 160°-170°, again depending upon the dimensions of the dump body B. It can be appreciated that moving the pivot location impacts the ability of a given spring pack to move the bail arm between its stowed and deployed positions. If a given spring pack is capable of the larger angular sweep required for a top rail pivot location it should be apparent that the spring force at the end of the sweep is significantly less than the spring force exerted at the end of a shorter angular sweep for the same spring pack. Moreover, it can be appreciated that a longer angular travel requires a greater initial fully wound torque for the torsion spring that may create the risk of spring failure.

Figure 7A:
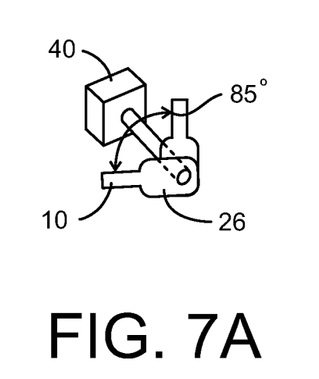
FIG. 7a is a schematic representation of the angular movement of a bail arm under operation of the interior actuator mechanism of the actuation system shown in FIGS. 2-3.
Figure 7B:
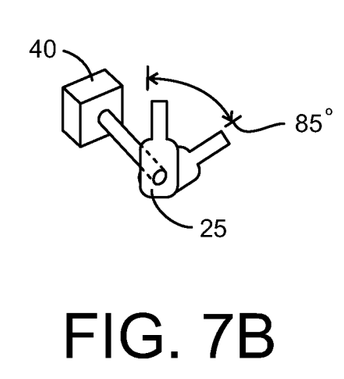
FIG. 7b is a schematic representation of the angular movement of the bail under operation of the exterior actuator mechanism shown in FIGS. 2-3.

The actuation system 20 disclosed herein addresses that problem by providing serial spring packs, namely the exterior actuator mechanism 25 and the interior actuator mechanism 40. One manner of operation of the serial spring packs is depicted in the schematic of FIGS. 7a-7b. Each spring pack in the two actuator mechanisms may be capable of the same range of angular movement, namely about 140° between wound and unwound positions. When the system is initially activated the spring pack of the interior actuation mechanism 40 begins the movement because it is anchored to the body B. The interior mechanism thus begins pivoting the bail arm 10 through the sweep angle of the interior spring pack $30_I$. At some point during this initial sweep the exterior actuator mechanism 25 will also apply torque to pivot the bail arm further. It can be appreciated that the "anchor" for the spring pack of the exterior actuator mechanism 25 is pivoting so that any pivoting induced by torque from the exterior spring pack will be additive.

The schematic representation of FIGS. 7a-7b provides a simplified representation of one way that the bail arm 10 is pivoted by the combined work of the interior and exterior actuator mechanisms. For instance, torque generated by the interior mechanism may contribute to pivoting the bail arm through a first angle, say 85°, while the torque generated by the exterior mechanism may contribute an additional angle of sweep of about 85° to achieve the total angular displacement between the open and closed positions of the cover system. The two spring packs may not exert torque in a discrete serial fashion but instead each mechanism 25, 40 may continuously and cumulatively exert torque throughout the full angular sweep of the bail arm. This continuous and cumulative torque generation is accomplished by one spring pack (the exterior spring pack) reacting against an "anchor" that is itself being pivoted by a second spring pack (the interior spring pack). However, it can be appreciated that neither spring pack pivots through its full angular range. In other words, as indicated above both spring packs $30_I$ and $30_E$ are capable of applying torque through about 140° but since the two spring packs act in series neither spring pack pivots through this full angle. Instead both spring packs only pivot through an angle of about 85° which means that neither spring pack becomes fully unwound.

In the embodiment of FIG. 3 a common shaft 35 extends between the base 32 of the spring packs in the inner and outer mechanisms 25, 40. In an alternative embodiment shown in FIG. 8 the interior actuator mechanism 40 includes a central post 75 that engages the base 32 of the springs 30, but this post 75 does not extend into the exterior actuator mechanism 25. Instead a base plate 70 is interposed between the two mechanisms. The base plate 70 includes a pair of posts 71 that extend inwardly toward the interior actuator mechanism 40 to engage the hooks 31 of the interior spring pack. The base plate further includes a central post 72 projecting outward toward the exterior actuator mechanism 25. The central post 72 includes a slot 73 to receive the base of the outer springs 30. A snap ring 38 may be provided to lock the spring pack onto the central post 72. The hooks 31 of the springs in the exterior actuator mechanism 25 engage posts 28 on the housing halves 27, as in the previous embodiment.

Figure 8:
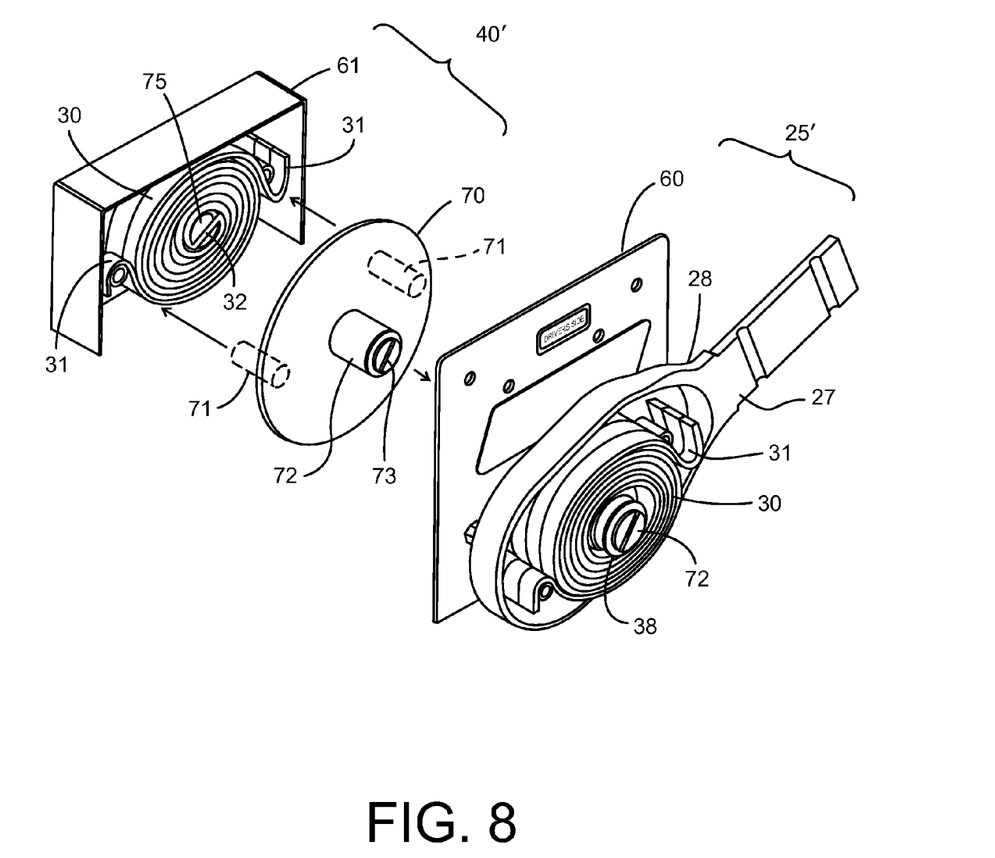
FIG. 8 is an exploded perspective view of an actuation mechanism according to a further embodiment.

It can be appreciated that for the assembly shown in FIG. 8 the interior and exterior springs are still in series, although they do not share a common central post or shaft, as in the assembly of FIG. 5. In this embodiment, the outer hooks of the interior springs are connected to the base portion of the exterior springs. It can thus be appreciated that the interior and exterior springs are wound in the same direction to produce the additive effect of series springs (as opposed to the prior embodiment in which the springs are wound in opposite directions). The total spring force and torque profile is generally the same between the two embodiments for like sized springs.

The series spring feature disclosed herein translates to a more uniform application of torque throughout the entire angular sweep of the bail arm, including at the end of the travel with the cover in its closed position. In the conventional actuation mechanism the torsion springs are nearly fully unwound at the end of their stroke so that they are not able to apply sufficient force to the end of the cover to hold the cover down during use. With the series actuation mechanisms 25, 40, each spring pack is able to apply significant force to the cover because the spring packs are each only partially unwound. This feature also protects the spring packs from failure due to high torque in their fully wound position. Since the series spring arrangement is able to provide a more uniform torque curve throughout the entire stroke of the bail arm, the initial starting torque of the fully wound springs does not need to be as high as with the prior systems.

While the actuation assembly described herein is susceptible to various modifications and alternative forms, specific embodiments thereof have been shown by way of example in the drawings and will herein be described in detail. It should be understood, however, that there is no intent to limit the actuation assembly to the particular forms disclosed. On the contrary, the intention is to cover all modifications, equivalents, and alternatives falling within the spirit and scope of the invention as defined by the appended claims.

For instance the spring packs disclosed herein are double-coil springs, of the type disclosed in the '790 Patent, to maximize torque output while minimizing the width prominence of the spring pack. However, the springs in one or both of the actuator mechanism 25, 40 may include other torsional spring configurations. In addition, the illustrated embodiment shows three springs in each spring pack, but it is understood that any number of springs may be utilized depending upon the needs and width considerations of the particular cover system.

Moreover, while the actuation assembly 20 is described as mounted to the sides of the vehicle or dump body, the assembly may also be mounted to the front and rear of the body for use in a side roll tarping system, such as the system disclosed in U.S. Pat. No. 6,857,682, the disclosure of which is incorporated herein by reference. In addition, the series actuation mechanisms may be incorporated into the tarp roller itself or into the horizontal portion of the bail arm supporting the cover.

What is claimed is:

1. An actuation assembly for a cover system on an open-topped container body, the cover system including a cover extendable from a stowed position to a deployed position covering the container body and a bail member attached to the cover and pivotably mounted to the container body to move the cover between its two positions, the assembly comprising:
   a first torsion spring having a base portion and a reaction end;
   a second torsion spring having a base portion and a reaction end;
   an elongated shaft extending between the first and second torsion springs;
   a first housing connectable to the bail member and defining a bore for rotatably receiving said shaft therethrough, said first housing configured to receive the first torsion spring therein,
   wherein the reaction end of the first torsion spring is mounted to the first housing, either the reaction end or the base portion of the second torsion spring is mounted to the container body, and the elongated shaft is engaged between the base portion of the first torsion spring and the base portion or reaction end of the second torsion spring that is not mounted to the container body, and
   further wherein each spring is wound about said shaft when the cover is in one of the deployed and stowed positions, and is unwound relative to said shaft when the cover is in the other of the deployed and stowed positions.

2. The actuation assembly of claim 1, wherein:
   the reaction end of said second torsion spring is mounted to the container body; and
   said elongated shaft extends between and engages the base portion of both the first and second torsion springs.

3. The actuation assembly of claim 1, wherein:
   the base portion of said second torsion spring is mounted to the container body; and
   said elongated shaft is engaged between the base portion of said first torsion spring and the reaction end of said second torsion spring.

4. The actuation assembly of claim 3, further comprising:
   a base plate disposed between said first and second torsion springs, said base plate including a post projecting therefrom arranged and configured to engage the reaction end of said second torsion spring,
   wherein said base plate includes said shaft mounted thereon and arranged to engage the base portion of said first torsion spring.

5. An actuation assembly for a cover system on an open-topped container body, the cover system including a cover extendable from a stowed position to a deployed position covering the container body and a bail member attached to the cover and pivotably mounted to the container body to move the cover between its two positions, the assembly comprising:
   a first torsion spring having a base portion and a reaction end;
   a second torsion spring having a base portion and a reaction end; and
   an elongated shaft extending between the first and second torsion springs,
   wherein either the base portion or the reaction end of the first torsion spring is connected to the bail arm, either the reaction end or the base portion of the second torsion spring is mounted to the container body, and the elongated shaft is engaged between the base portion or reaction end of the first torsion spring that is not connected to the bail arm and the base portion or reaction end of the second torsion spring that is not mounted to the container body,
   wherein each spring is wound about said shaft when the cover is in one of the deployed and stowed positions, and is unwound relative to said shaft when the cover is in the other of the deployed and stowed positions, and
   further wherein said second torsion spring is a double-coil spring having two coil portions concentrically wound around each other and disposed in a common plane with an integral center portion between each said coil portion defining said base portion, each of said coil portions including a coil portion reaction end, both coil portion reaction ends either mounted to the container body or engaged to said elongated shaft.

6. The actuation assembly of claim 5, wherein said first torsion spring is a double-coil spring having two coil portions concentrically wound around each other and disposed in a common plane with an integral center portion between each said coil portion defining said base portion, each of said coil portions including a coil portion reaction end, both coil portion reaction ends either connected to the bail arm or engaged to said elongated shaft.

7. The actuation assembly of claim 1, wherein said assembly comprises a plurality of said second torsion springs forming a second torsion spring pack, either the base portion of each second torsion spring in said second torsion spring pack or the reaction end each second torsion spring in said second torsion spring pack being mounted to the container body.

8. The actuation assembly of claim 7, wherein said assembly comprises a plurality of said first torsion springs forming a first torsion spring pack, the reaction end each first torsion spring in said first torsion spring pack being mounted to the first housing.

9. The actuation assembly of claim 1, further comprising at least one bearing rotatably supporting said shaft between said first torsion spring and said second torsion spring.

10. The actuation assembly of claim 1, further comprising:
    a second housing mountable to the container body and defining a bore for rotatably receiving said shaft therethrough, said second housing configured to receive the second torsion spring therein.

11. The actuation assembly of claim 10, wherein the second reaction post of said second torsion spring is selectively mounted to said second housing at two or more locations on said second housing to adjust the initial torque in the second torsion spring.

12. The actuation assembly of claim 10, further comprising at least one bearing disposed in said bore of said second housing and rotatably supporting said shaft.

13. The actuation assembly of claim 1, wherein said elongated shaft includes a slot defined at one end and a slot defined at the opposite end, each slot configured to receive a corresponding base portion of said first and second torsion springs.

14. The actuation assembly of claim 1 in combination with an open-topped container body having a length across which the cover is extendable and a side width between each side of the container body, the actuation assembly mounted to the container body with said second torsion spring disposed inside the side width of the container body and said first torsion spring disposed outside the side width of the container body.

15. The actuation assembly of claim 7 in combination with an open-topped container body having a length across which the cover is extendable and a side width between each side of the container body, the actuation assembly mounted to the container body with said second torsion spring pack disposed entirely inside the side width of the container body and said first torsion spring disposed outside the side width of the container body.

16. The actuation assembly of claim 8 in combination with an open-topped container body having a length across which the cover is extendable and a side width between each side of the container body, the actuation assembly mounted to the container body with said second torsion spring pack disposed entirely inside the side width of the container body and said first torsion spring pack disposed outside the side width of the container body.

17. An actuation assembly for a cover system on an open-topped container body, the cover system including a cover extendable from a stowed position to a deployed position covering the container body and a bail member attached to the cover and pivotably mounted to the container body to move the cover between its two positions, the assembly comprising:
  a first torsion spring having a base portion and a reaction end;
  a second torsion spring having a base portion and a reaction end; and
  an elongated shaft extending between the first and second torsion springs,
  a first housing connectable to the bail member and defining a bore for rotatably receiving said shaft therethrough, said first housing configured to receive the first torsion spring therein; and
  a second housing separate from said first housing and mountable to the container body, said second housing defining a bore for rotatably receiving said shaft therethrough and configured to receive the second torsion spring therein,
  wherein either the base portion or the reaction end of the first torsion spring is connected to the first housing, either the reaction end or the base portion of the second torsion spring is mounted to the second housing, and the elongated shaft is engaged between the base portion or reaction end of the first torsion spring that is not connected to the first housing and the base portion or reaction end of the second torsion spring that is not mounted to the second housing,
  wherein each spring is wound about said shaft when the cover is in one of the deployed and stowed positions, and is unwound relative to said shaft when the cover is in the other of the deployed and stowed positions.

\* \* \* \* \*